Dec. 24, 1935.   J. L. GONARD   2,025,234
DEVICE FOR PREVENTING RETROGRADE MOVEMENT OF VEHICLES
Filed Oct. 18, 1934   2 Sheets-Sheet 2
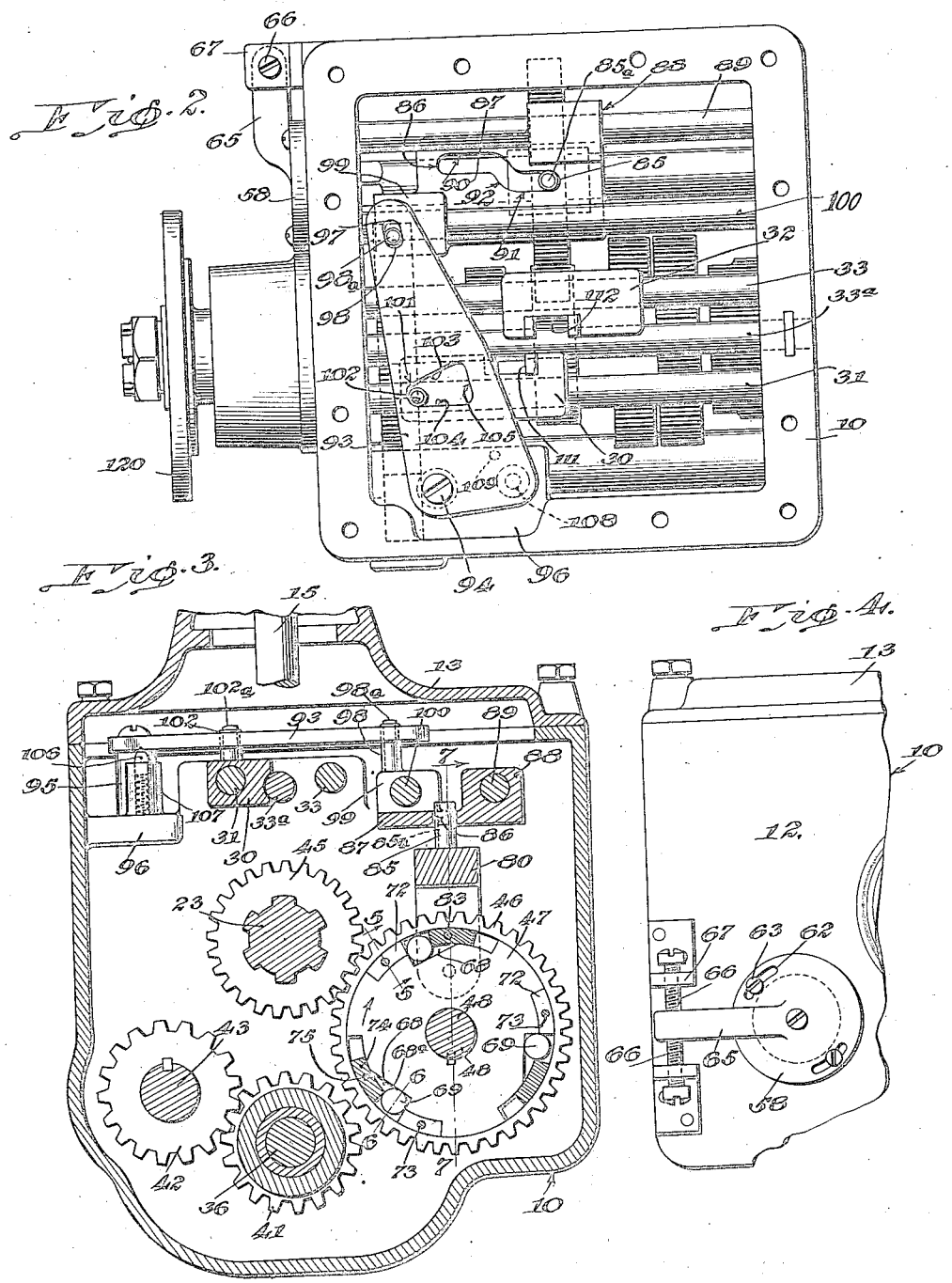
WITNESS
INVENTOR
J. L. Gonard
BY
ATTORNEYS Patented Dec. 24, 1935

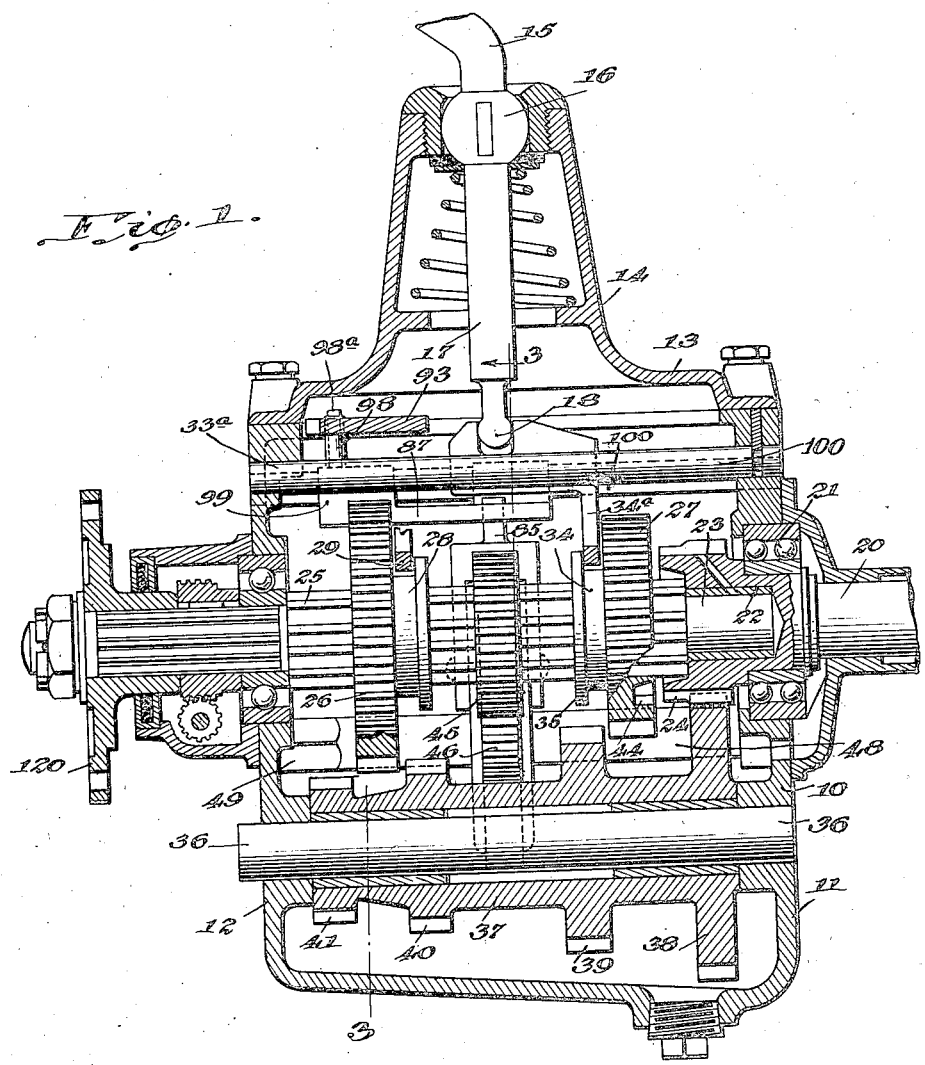

2,025,234

UNITED STATES PATENT OFFICE 2,025,234

DEVICE FOR PREVENTING RETROGRADE MOVEMENT OF VEHICLES

John Louis Gonard, Englewood Cliffs, N. J.

Application October 18, 1934, Serial No. 748,933

7 Claims. (Cl. 192—4)

This invention relates to a device for preventing retrograde movement of a vehicle.

An object of the invention is the provision of a device adapted to be incorporated in a transmission in such a manner that when the shifting lever is moved to low speed, second speed, or high speed or the neutral positions between such speeds, the drive shaft will be held against reverse rotation while permitting rotation in the opposite direction for forward speeds, thereby preventing the vehicle from rolling backwardly when said vehicle is located on an inclined roadbed.

Another object of the invention is the provision of a device adapted to be incorporated in a transmission of an automobile in such a manner that the driver of the automobile may release the hand brake and the service brake when the vehicle is located upon an inclined roadbed and when the vehicle is in such position as to move forwardly up a hill and release the clutch pedal for connecting the engine shaft with the driven shaft of the transmission to permit the vehicle to move forwardly.

A further object of the invention is the provision of a device incorporated in the transmission of a motor vehicle for preventing reverse rotation of the main driven shaft of the transmission to prevent retrograde movement of a vehicle when said vehicle is on an inclined roadbed, the device including a lever, a one-way braking means for the driven shaft of the transmission which is moved to an operative position by pin and slot connection in the lever, the pin being connected with a shifter rod of the vehicle.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a vertical view in section of a transmission showing my invention applied thereto, Figure 2 is a plan view of the transmission with the cover removed, Figure 3 is a transverse vertical section taken along the line 3—3 of Figure 1, Figure 4 is a fragmentary view in elevation of the rear portion of the casing showing adjusting means for the braking device, Figure 5 is a section taken along the line 5—5 of Figure 3, Figure 6 is a fragmentary section taken along the line 6—6 of Figure 3, and Figure 7 is a vertical section taken along the line 7—7 of Figure 3.

Referring more particularly to the drawings, 10 designates a transmission housing having a front wall 11, a rear wall 12, and a removable cover plate 13.

The cover plate has a domed section 14 in which is mounted the lower end of a shifting lever 15 having a universal joint 16 in the upper end of the member 14. The lever 15 has a portion 17 projecting downwardly and provided with a ball-like member 18 for a purpose which will be presently explained.

An engine drive shaft 20 has bearings 21 in the front wall 11 of the housing 10. The shaft 20 is provided with a bearing 22 for one end of a driven shaft 23. This shaft is also provided with a clutch member 24 located within the housing 10.

The shaft 23 is provided with a plurality of splines 25 adapted to be received by complementarily formed slots at the inner periphery of slidably mounted gears 26 and 27. The gear 26 is provided with a flanged portion 28 adapted to receive a yoke 29 carried by the shifter element 30 which in turn is connected with a shifter rod 31 slidably mounted in the housing 10.

A second shifter element 32 is secured to a shifter rod 33 which is also slidably mounted in the housing 10. This shifter element carries a yoke 34ª which is adapted to engage a groove 34 of a flanged portion 35 of the gear 27.

The countershaft 36 is mounted in bearings in the housing 10. Upon this shaft is rotatably mounted a sleeve 37 upon which is integrally formed a high speed gear 38, a second speed gear 39 and a low speed gear 40 and a reversing gear 41.

A gear 42 is keyed to a shaft 43 meshes with the gear 41 and is adapted to mesh with the gear 26 when said gear is moved to the reverse position as will be presently explained. The gear 26 is adapted to mesh with the gear 40 when the shifter element 30 is moved to the right in Fig. 2 for producing low speed.

The gear 27 is adapted to mesh with the gear 39 when the shifter element 32 is moved to the left in Fig. 2.

The gear 27 is provided with an integral clutch element 44 which is adapted to engage the clutch element 24 on the shaft 20 when the gear 27 is moved to the right in Figs. 1 or 2 and when the shifter element 32 is moved to the right as shown in Fig. 2.

A braking mechanism is provided which will prevent the shaft 23 from being reversely rotated when the vehicle to which the transmission is attached is located on an inclined roadbed and will prevent the vehicle from retrograde movement down the incline when the clutch is in and when either the gears have been shifted to low speed, second speed, or high speed, or when the shifting lever 15 is in neutral position and when said lever has been moved from either low speed, second speed, or high speed to said neutral position.

The braking device is shown more particularly in Fig. 3 and includes a gear 45 secured to the shaft 23 with a ring gear 46 meshing with the gear 45 and held against rotation as will be presently explained.

A circular plate 47 is secured to a shaft 48 and rotatably supports the ring gear 46 at its periphery. The shaft 48 has squared ends as shown at 49 in Fig. 7 and is received within a square socket 50 formed in a plate 58 which is mounted upon the outer face of the rear wall 12 of the transmission housing 10. A plate 58 is provided with a boss 60 mounted within an opening 61 within the rear wall 12.

The plate is provided with arcuately-shaped slots 62 adapted to receive set screws 63 threaded into openings in the wall 12 for aiding in securing the plate 58 into position.

This plate is provided with an arm 65 which is held in position by means of two set screws 66 threaded into openings in brackets 67 secured to the rear wall 12. The adjustment of the screws 66 will raise or lower the arm 65 for a purpose which will be presently explained.

The disc or plate 47 is held stationary and is provided with annularly-shaped pockets 68 at the periphery thereof. Roller bearings 69 are mounted in the pockets.

A circular plate 70 is located on one face of the stationary disc 47 while a rockable plate 71 is located on the opposite face of the disc 47. Each plate is provided with openings to receive the shaft 48. The plate 70 is provided with inwardly projecting lugs 72 and bolts 73 secure the plate 71 to the free end of the lugs, as shown in Figs. 3 and 5. These lugs are arcuately-shaped and are located within pockets 75 adjacent the pockets 68.

Lugs 74 are secured to the inner face of the plate 71 and project into pockets 75 formed at spaced intervals along the periphery of the disc 47.

A yoke 80 forming a lever has its arms 81 secured at 82 to the plates 70 and 71. A pin 83 is driven through aligned passages in the plates 71, in one of the lugs 74, and plate 70 and co-operating with the bolts 82 for securing the yoke 80 in rigid relation with the plates 70 and 71 wherein by the plates may be rocked for shifting the lugs 72 and 74 and for moving the roller 69 within the pockets 68 along the bottom walls 68ᵃ of said pockets. It will be noted that these walls incline inwardly so that the rollers 69 may be jammed between said walls and the inner periphery of the ring gear 46.

The yoke or lever 80 is provided with a roller 85 mounted on a pin 85ᵃ which projects into a slot generally designated by the numeral 86 formed in a plate 87 which has a sleeve 88 slidably mounted on a rod 89 carried by the front and end walls of the housing 10.

The slot 86 is provided with a portion 90, a parallel portion 91, and an angular portion 92 connecting the portions 90 and 91 together.

A lever 93 is pivotally mounted at 94 on a post 95 formed integrally with a bracket 96 carried by a housing 10. One end of the lever is provided with a slot 97 adapted to receive a roller 98 secured to a block 99 formed mounted on a pin 98ᵃ secured to the plate 87 so that when the lever integrally with the plate 87 is rocked the block 99 and likewise the plate 93 will be shifted longitudinally of the transmission housing 10. The block 99 is provided with an opening to receive a rod 100 which is fastened to the end walls of the housing 10. Thus it will be seen that the rods 89 and 100 together with the sleeve 88 and the block 99 serve as guides for the plate 87.

The lever 93 intermediate its ends is provided with a triangularly-shaped slot 101 having rounded apices for receiving a roller 102 mounted on a pin 102ᵃ secured to an extension of the shifter element 30.

A rod 33ᵃ is secured to the end walls of the housing 10 and co-operates with the shifting elements 30 and 32 for aiding in maintaining them in a horizontal position as is well known.

The slot 101 has an edge 103, an edge 104, and an edge 105.

A spring-pressed plunger 106 is mounted in a post 107 carried by the bracket 96 and is adapted to engage notches 108 and 109 for maintaining the lever 93 in two positions of movement.

The operation of my device is as follows: Referring to Fig. 2 it will be seen that the transmission is in reverse with the shifting element 30 moved to the left. This is obtained in standard transmissions by rocking the shift lever 15 to the left and then moving it forwardly. This causes the right hand shifting element 30 to be moved to the rear so that whatever position the lever 93 was in it will have been moved to the position shown in Figure 2.

In this position, disclosed in Fig. 3, the roller 85 is located in the portion 91 of the slot 86 so that the plates 70 and 71 which are connected to the yoke 80 will have been rocked whereby the lugs 72 and 74 will have moved the rollers 69 into the wider portion of the pockets 68. In this position, the rollers 69 cannot be jammed between the bottoms 68ᵃ of the pockets and the inner periphery of the ring gear 46 and the ring gear 46 may rotate in either direction as will the gear 45 and the shaft 23.

If the shifter element 30 be moved to neutral position, that is, with the pockets 111 and 112 being in alignment, the roller 102 will be carried to the right in Fig. 2 and along the edge 104 without causing rocking of the lever 93. Therefore, the roller 85 will remain in the portion 91 of the slot 86.

At this time it will be seen that while the shift lever 15 has been moved to neutral position from reverse and the slots 111 and 112 have been aligned, the lever 93 will not have been shifted so that the car may be moved rearwardly by man power or the car may be allowed to move backwardly down a hill if desired. In other words, when the shifter lever is in the reverse position or in the neutral position after having been moved to said position from reverse position, the roller bearings 69 will not act as braking elements to prevent reverse rotation of the shaft.

When the shifting lever 15 is moved to low speed, the element 30 will be moved to the right in Fig. 2 and since the roller 102 has been moved to the right and in engagement with the edge 105, the outer end of the lever 93 adjacent the roller 98 will be moved to the right, thereby shifting the plate 87 and moving the roller 85 into the portion 90 of the slot 86. Since the roller 102 is in engagement with the edge 105 of the slot and the shifter element 30 is moved to the right in Fig. 2, the roller forces the lever 93 to oscillate on its pivot 94.

In the low speed position just obtained, the yoke or lever 80 has been rocked by the movement of the roller 85 into the portion 99 of the slot 86 and this will cause rocking of the plates 70 and 71 and thereby cause a slight rotation of the lugs 72 and 74 in the direction indicated by the arrow in Fig. 3, thereby moving the rollers 69 towards the reduced end of the pockets 68. In this position of the rollers 69 the ring gear 46 will be held against rotation in the direction indicated by the arrow in Fig. 3 and which would be the rotation which would permit retrograde movement of the vehicle through the drive shaft of the vehicle when the vehicle is on an inclined roadbed and facing the top of the hill.

When the gear shift lever is moved to neutral position from this low speed, the shifter element 30 will be moved to a position where the slot 111 will align with the slot 112, so that the roller 102 will move along the edge 103 to the position in the slot which is located at the apex between the sides 104 and 103. During this movement of the roller in the slot 101 the roller will not act on the lever unless the roller were moved by the shifter element towards the reverse position.

When the shifting lever has been moved from low speed to neutral position, as has been stated, the lever 93 is not actuated so that the member 18 of the shifter element 15 may be moved to the slot 111 in the shifter element 32. Movement of the shifter element from neutral position to second speed and then to high speed will have no effect on the lever 93 since the shifter element 32 has no connection whatever with the lever 93. Therefore, it will be seen that the shifter element may be moved from low speed to neutral, to second speed, and then to high speed and then back to neutral without changing the position of the lugs 72 and 74 carried by the plates 70 and 71, respectively. Therefore, the braking action of the device will be had during these periods of movement of the shifting lever.

It will, therefore, be seen that the device is so constructed that it will act as a brake at all times to prevent reverse rotation of the shaft 23 and to prevent retrograde movement of the vehicle when the shifting lever has been moved from low speed to neutral or from neutral to second speed or to high speed and back again to neutral and low speed, while on the other hand when the shifting lever is moved to the reverse position, the lever 93 will cause release of the braking element to permit the engine to reverse the vehicle under its own power. When the shifting lever is moved to neutral position from reverse, the braking element is inoperative and only becomes operative when the shifting lever has been moved to low speed which initiates the positioning of the braking device.

The shaft 23 is provided with a flange 120 for connecting the said shaft with the usual propeller shaft of the vehicle.

I claim:

1. In an automobile transmission having a driven shaft, a gear slidably keyed on the driven shaft and controlling the reverse and low speeds, a shifter element for said gear, a pivotally mounted lever having a triangularly-shaped opening, a roller on the shifter element projecting through said opening and adapted to engage the opposite ends of the opening for actuating the lever, said roller movable along one edge of the opening when the shifter element is moved from the reverse position to neutral position without causing actuation of the lever, a one-way braking means adapted to prevent rotation of the shaft in one direction when the transmission is in any of the forward speeds or when placed in neutral from any of said forward speeds, and means connecting said lever with the braking means for causing the braking means to be released when the shifter element is moved to the reverse position.

2. In an automobile transmission for providing forward speeds and a reverse speed for the automobile and including a drive shaft for the automobile, a gear slidably keyed on the shaft for producing either a low speed or reverse speed, a shifter element for the gear and provided with a roller, a pivotally mounted lever having a triangularly-shaped opening to receive the roller, said roller movable between the apices of the triangular opening and engaging the side edges of the opening for causing oscillation of the lever when the gear is moved between the reverse position and low speed positions, a one-way braking means for the drive shaft adapted to remain in an operative position during forward speed and neutral positions when said neutral positions have been obtained by the transference to said neutral position from the forward speed positions, and means connecting the lever with the one-way braking means.

3. In a transmission for motor vehicles adapted to provide forward speeds and a reverse speed and including a driven shaft for the vehicle, a combined reverse and low speed gear slidably keyed to the shaft, a shifter element for the gear, a pivotally mounted lever having a triangularly-shaped opening, a roller on the shifter element and received by the opening, a brake means adapted to prevent reverse rotation of the shaft during forward speeds and the neutral position associated with the forward speeds, and means connected with the lever and braking means and lever for retaining the braking means operative during forward speeds and associated neutral position but releasing the braking means during reverse speed and the associated neutral position of the shifter element.

4. In a transmission for motor vehicles adapted to provide forward speeds and a reverse speed and including a drive shaft for the vehicle, slidably keyed to the shaft, a shifter element for the gear, a pivotally mounted lever having a triangularly-shaped cam opening, a roller on the shifter element and received by the opening, a braking means adapted to prevent reverse rotation of the shaft during forward speeds and the neutral positions associated with the forward speeds, a rocking lever for operating the braking means, a slidably mounted plate connected with the first-mentioned lever and provided with a slot, the opposite end portions of the slot being offset from each other, the end of the rocking lever being received by the slot, the shifting of the plate causing the end of the rocking lever to be moved into one offset portion of the slot to retain the braking means operative, while, when the end is received by the other offset portion, said braking means will be in an inoperative position.

5. In a transmission for motor vehicles adapted to provide forward speeds and a reverse speed and including a drive shaft for the vehicle, a combined reverse and low speed gear slidably keyed to the shaft, a shifter element for the gear, a pivotally mounted lever having a triangularly-shaped opening, a roller on the shifter element and received by the opening, a braking means adapted to prevent reverse rotation of the shaft during forward speeds and the neutral position associated with the forward speeds, a connecting means between the lever and the braking means and including a slidably mounted plate having a pair of parallel slots and a universal slot connecting the inner ends of the slots together, said plate being connected with the lever, means for operating the braking means and including a roller received in one of the parallel slots for retaining the braking means in an operative position, the last-mentioned roller adapted to be moved into the other slot when the plate is shifted for causing release of the braking means.

6. In a transmission for motor vehicles adapted to provide forward speeds and a reverse speed and including a main driven shaft, a combined reverse and low speed gear slidably keyed to the shaft, a shifter element for the gear, a braking means adapted to prevent reverse rotation of the driven shaft during forward speeds and neutral positions associated with the forward speeds, said braking means including a gear fixed on the shaft, a ring gear in mesh with the fixed gear and normally revolved in one direction by the fixed gear during forward speeds, a support normally held against movement for rotatably mounting the ring gear, braking elements carried by the support and adapted to retain the ring gear against rotation in one direction, means connected with the shifter element for moving the braking elements to an inoperative position when the shifter element has been moved to place the reverse speed gear in an operative position.

7. In a transmission for motor vehicles adapted to provide forward speeds and a reverse speed and including a main driven shaft, a braking means for the driven shaft adapted to prevent reverse rotation of the shaft during forward speeds and during such neutral positions of the transmission which are associated with the forward speeds, said braking means including a gear fixed on the shaft, a ring gear in mesh with the fixed gear, a disc, means for retaining the disc against rotation, braking elements carried by the disc and adapted to retain the ring gear against rotation in one direction during forward and associated neutral positions of the transmission, means for releasing the braking elements during reverse speed, a shifter element controlling reverse speed, and means connecting the shifter element with the releasing means.

JOHN LOUIS GONARD.